United States Patent [19]
Tyznik

[11] 3,876,055
[45] Apr. 8, 1975

[54] FARM WASTE MATERIAL HANDLER

[76] Inventor: Henry N. Tyznik, Rt. 1, Colby, Wis. 54421

[22] Filed: Feb. 23, 1973

[21] Appl. No.: 335,141

[52] U.S. Cl. .................. 198/7; 198/79; 198/233
[51] Int. Cl. ........................................ B65b 65/02
[58] Field of Search ............ 198/7, 64, 79, 78, 233, 198/128, 75, 9; 214/42 R; 56/105, 106

[56] References Cited
UNITED STATES PATENTS

| | | | |
|---|---|---|---|
| 2,369,755 | 2/1945 | Rosselot | 198/64 UX |
| 2,406,058 | 8/1946 | Boone | 56/105 X |
| 2,605,106 | 7/1952 | Gilmore | 198/128 |
| 3,348,652 | 10/1967 | Vinyard | 198/7 |

Primary Examiner—James B. Marbert
Assistant Examiner—Douglas D. Watts
Attorney, Agent, or Firm—Berman, Bishoff & Platt

[57] ABSTRACT

A tractor power take-off powered multi-purpose farm waste material handler having shoveled end augers for elevation farm waste material into a cross auger. The cross auger brings the material together to the center of the auger and then drops the material into a rear extending back auger for carrying the material into the spreader. Thus the spreader box is filled from the front to the rear. A completely hydraulic manure spreader is also described which is driven by the tractor power take-off. An hydraulic cylinder moves the load to the hydraulic motor driven beater and then returns the front gate back to the load position. In another embodiment, for use in a free stall, loose housing or confined yard the waste material is loaded by attaching a front cross auger between the end augers. The front cross auger separates and moves the material to the sides and into paddles which push the material into the side elevating augers.

7 Claims, 7 Drawing Figures

FARM WASTE MATERIAL HANDLER

BACKGROUND OF THE INVENTION

1. Field of the Invention

This invention relates to waste material handling apparatus and more particularly relates to a portable one man, labor saving apparatus which can be used with a conventional farm tractor for handling and processing farm waste material.

2. The Prior Art

As modern farming techniques increasingly require the use of mechanized equipment, in order to compensate for the shortage and expense of hired help or labor, there has been an increasing demand for farm equipment which can be operated by a single person performing all the various steps in any given operation. While various attempts have been made to effect this desired end, and in some cases such attempts have been successful, no fully mechanized farm waste material handling apparatus has been devised which is easy to operate, economical and readily adaptable to a number of different types of operations.

Typical of the prior art structures which have attempted to solve the above-stated problems, particularly with respect to the conveying of grain and the like, are those set forth in U.S. Pat. Nos. 2,390,286 to Adams, 2,467,619 to Griffith et al., 2,479,899 to Beyer, 2,623,624 to Slocum, 2,709,011 to Radin et al., 2,926,477 to Bebow, and 3,297,148 to Andrews. However, each of these apparatuses suffers from one or more problems and none is as versatile and efficient as the waste material handling apparatus of the present invention.

Accordingly, the object of the present invention is to provide a one man operated, labor-saving, time-saving, economical and versatile means of handling farm waste material, which is completely portable, which can be easily transferred from one barn, feed lot, stack, to another in a rapid and efficient manner and which requires no additional motors or machines other than the conventional farm tractor.

SUMMARY OF THE INVENTION

The present invention embodies a fully mechanized farm waste material handler capable of being operated by a single operator. The material handler comprises, in one embodiment, two shoveled end augers which convey the waste material upwardly and rearwardly into a raised cross auger, which brings the waste material together toward the central portion of the cross auger and drops the material into the back, rearwardly extending auger. The back auger carries the waste material to the manure spreader box, filling the box from the front to the rear. By means of a clutch controlled by the operator, the spreader may be activated when desired, and the augers deactivated.

The power take-off from the tractor, which drives all the augers, may also be utilized to drive the manure spreader, which in a preferred embodiment of the invention utilizes a gate which is powered by an hydraulic pump, driven by the power take-off of the tractor. An additional auger, or beater, is mounted at the front of the spreader for evenly distributing the waste material over a desired area. This auger is also driven by the hydraulic motor. After the gate has delivered the load to the auger, it is returned to its initial position so as to enable the spreader to accept an additional load of waste material.

The above-described embodiment of the invention, employing shovel ended augers, is useful when the apparatus is to be used as a gutter barn cleaner, for example. However, when the apparatus is to be used as a free stall, loose housing or confined feeding yard cleaner, a front cross auger is employed, connected between the two upwardly inclined end augers. The front cross auger separates and moves the material to the sides and into paddles, which push the material on to the elevating end augers.

DETAILED DESCRIPTION OF THE PREFERRED EMBODIMENTS

Figure 1:
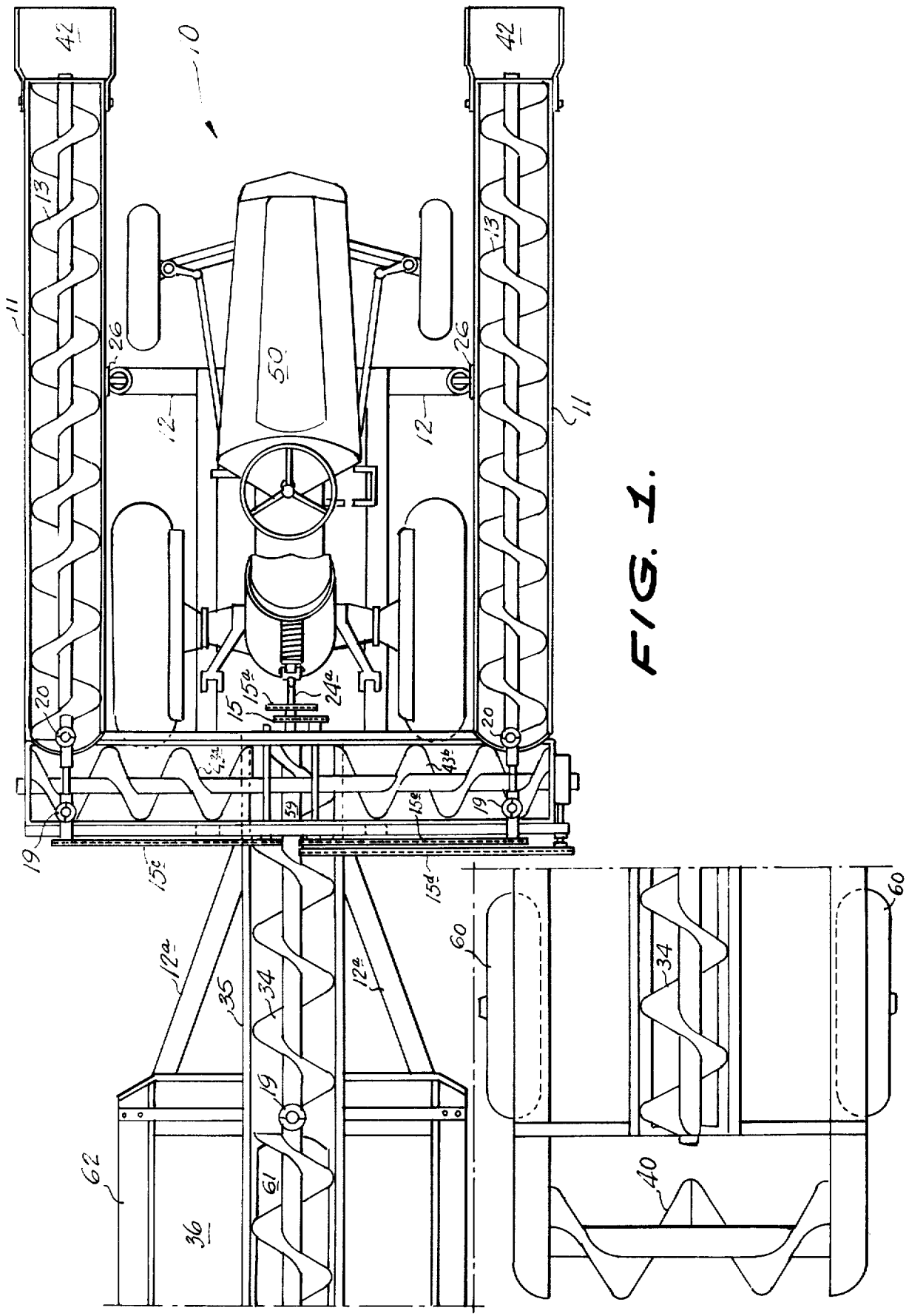
FIG. 1 is a top plan view of the farm waste material handler of the present invention, in a first embodiment not employing the front cross auger.
Figure 2:
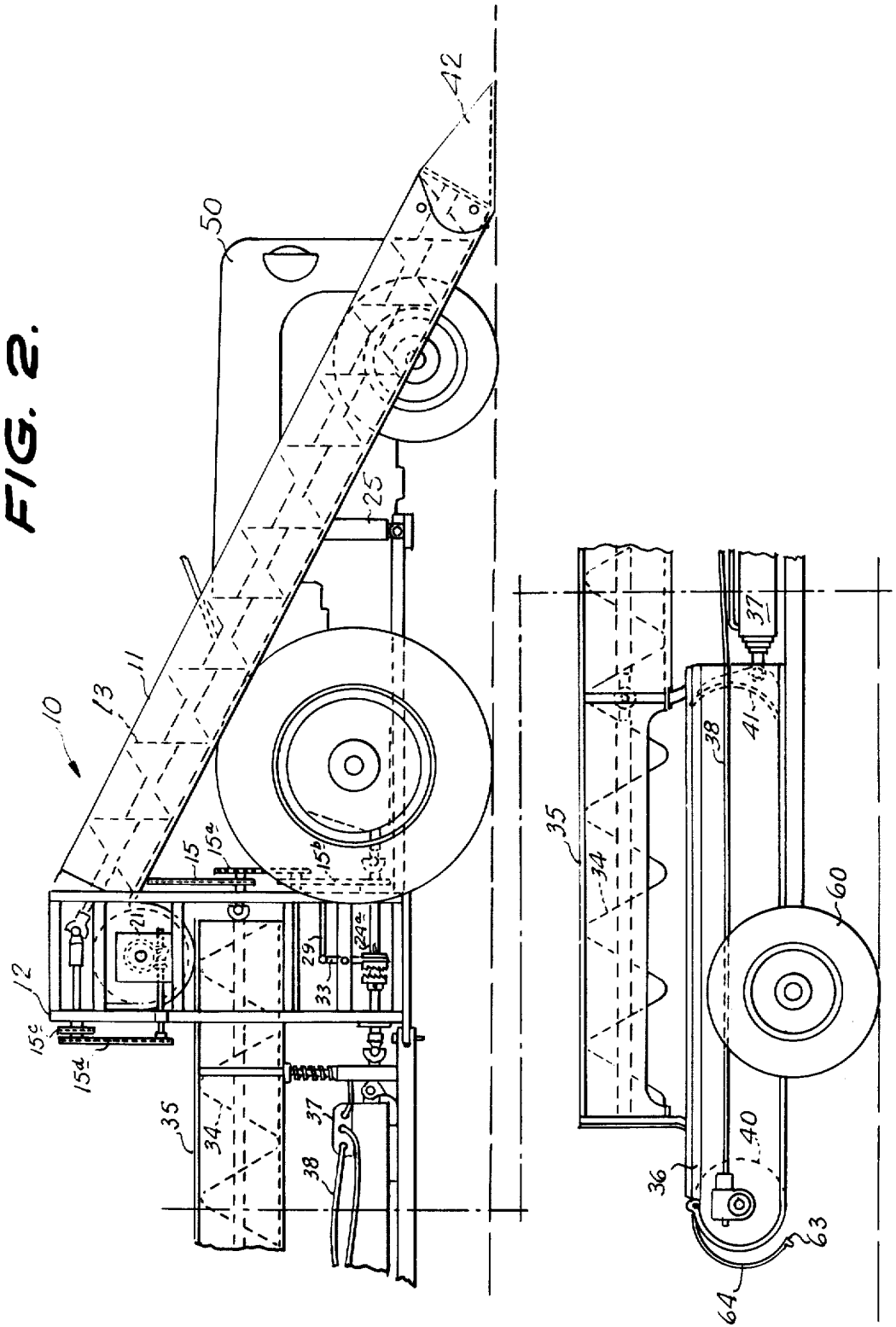
FIG. 2 is a front elevational view of the farm waste material handler of FIG. 1.

Turning now to the drawings, and particularly FIGS. 1 and 2, there is illustrated the farm waste material handler of the present invention, generally designated by the reference character 10. Conventional farm tractor 50 drives main drive shaft 24$a$ through its power take-off and the other drive shafts 24 through roller drive chains 15, 15$a$, 15$b$, 15$c$, 15$d$ and 15$e$, small drive gears 16 equipped with slip clutches and large drive gears 18 for reducing the power take-off speed, in a manner which will be more fully described below. Attached to the tractor 50 by conventional framing members 12, formed, for example, of boxed steel beams, are the combination of augers forming the principal parts of the farm waste material handler of the present invention.

Elevating end augers 13 are disposed within open troughs 11, which have attached at their front ends, by bolts or other conventional means, shovels 42. Troughs 11 communicate with cross auger trough 44, having disposed therewithin cross auger 43 comprising a left-hand section 43$a$ and a right-hand section 43$b$. Both these sections 43$a$ and 43$b$ rotate in a manner so as to force the material toward the center of the trough 44 and through opening 59 therein, into rear trough 35.

Disposed within rear trough 35 is rearwardly directing auger 34, disposed over spreader 36, mounted on conventional wheels 60. The bottom of trough 35 is provided with an opening 61 therein so as to communicate the trough with the interior of spreader 36.

Hydraulic cylinders 25 are mounted on brackets 26 in a conventional manner for the purpose of raising end elevating troughs 11 when it is desired, for example, to move the apparatus to a new location. These hydraulic cylinders are operated by conventional controls in a manner well known in the art. Drive shaft universals 19 and slide shaft universals 20 are provided to impart flexibility to the apparatus and allow for any movements required by the demands of a particular work situation.

As shown in FIGS. 1 and 2, the spreader 36 of the present invention comprises a generally open topped box-like member 62 attached to the apparatus and supported by framing members 12a. The forward end 63 of the spreader is open and guard 64 is provided to direct the material downwardly in the manner in which spreading is desired. Disposed at the forward end of spreader 36 is auger 40 which serves to properly spread the material and is driven through hydraulic power supplied via lines 38 from hydraulic pump 37. Pump 37 is driven by main drive shaft 24a, which, as explained above, derives its power from the tractor power take-off. Hydraulic pump 37 also drives pusher gate 41 from the rearmost position, as illustrated in FIG. 2, to the forwardmost position for delivering the load to auger 40. Pusher gate 41 is then returned to its initial position by the conventional two-way hydraulic cylinder powered by the hydraulic pump 37. It will be understood that the details of the hydraulic pump and system form no part of the present invention, since they are conventional and readily understood by those skilled in the art and therefore are not illustrated in detail.

Figure 3:
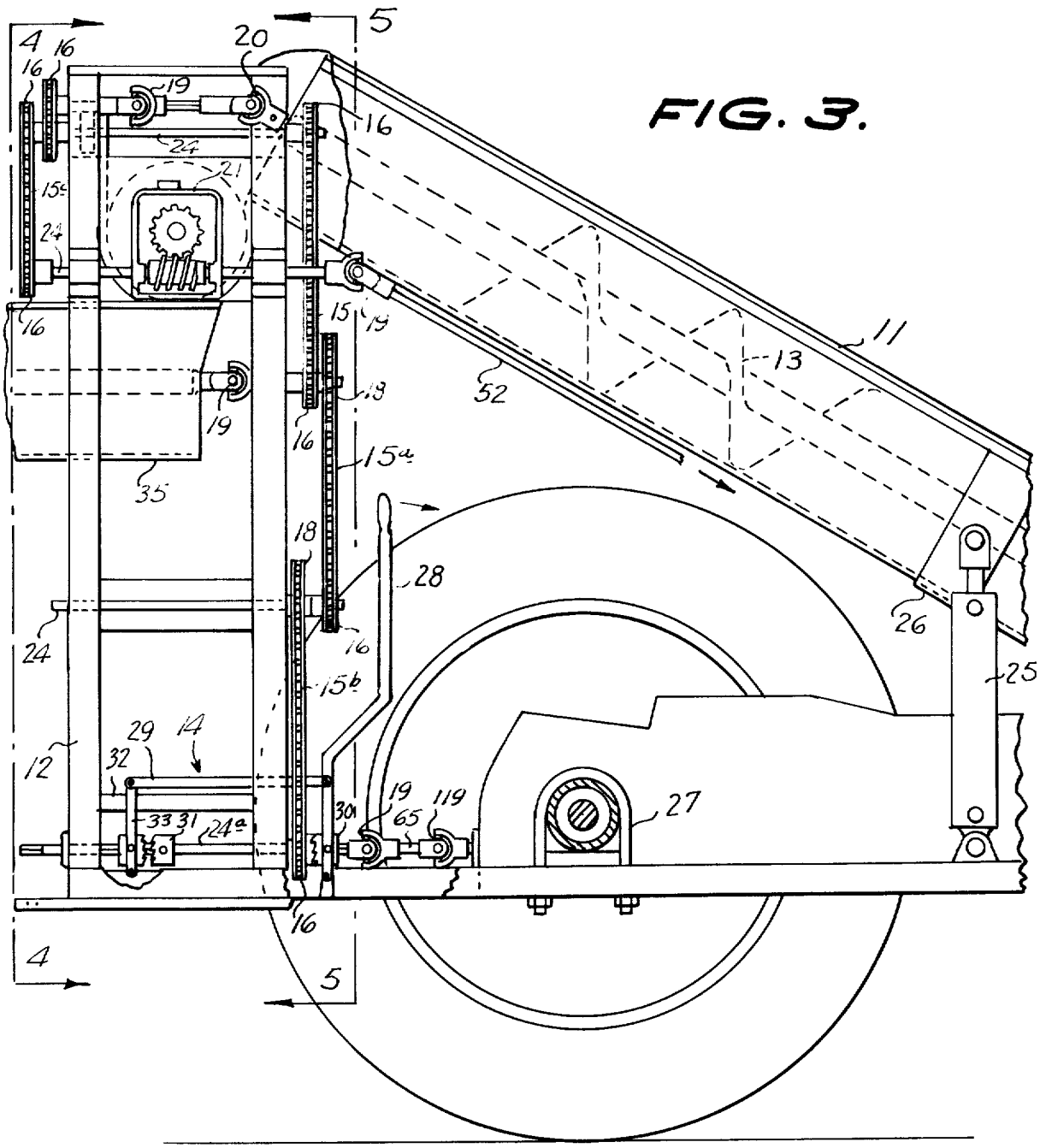
FIG. 3 is an enlarged detail of a portion of FIG. 2, illustrating the drive mechanism for the farm waste material handler.
Figure 4:
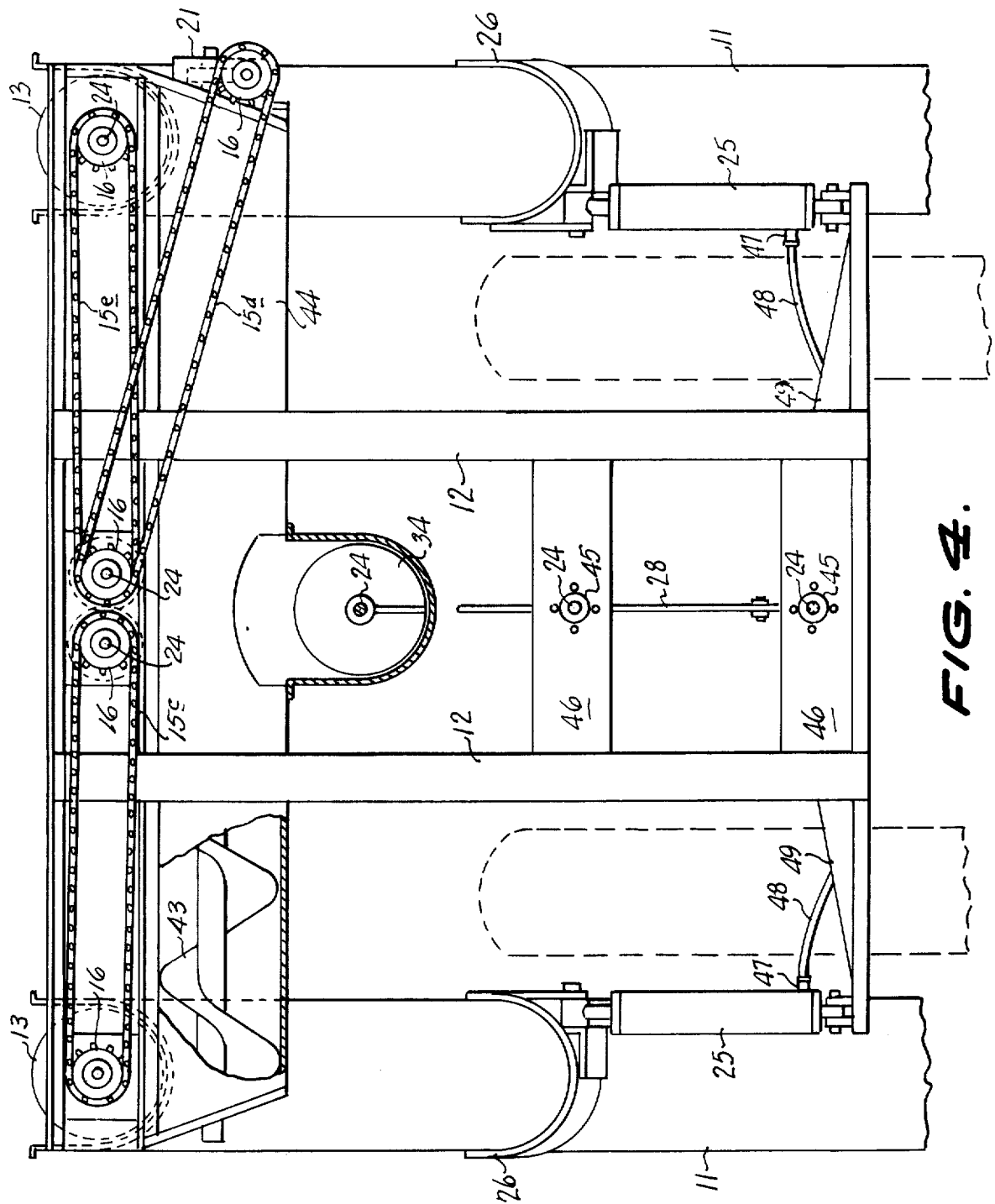
FIG. 4 is a side elevational view looking in the direction of the arrows 4—4 in FIG. 3.
Figure 5:
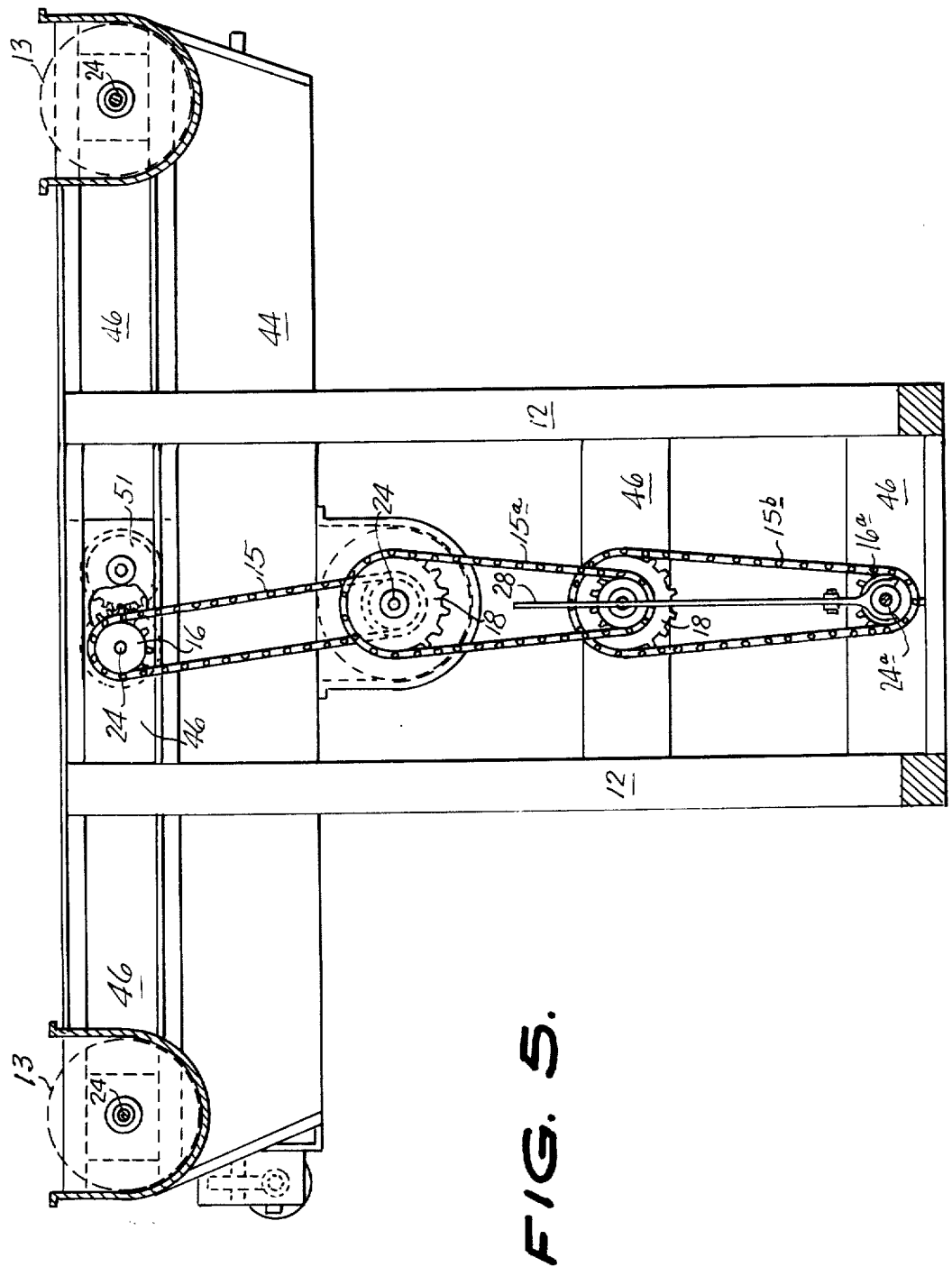
FIG. 5 is a side elevational view, looking in the direction of the arrows 5—5 in FIG. 3.

Referring now to FIGS. 3, 4 and 5, the driving mechanism for the present invention will be described in more detail. As shown in FIG. 3, U-type bolts 27 are utilized to mount the waste material handler to the tractor. Main drive shaft 24a is connected to the power take-off of the tractor by means of an extendible drive shaft 65 and universals 19. The rear portion of main drive shaft 24a is, as explained above, connected to the hydraulic pump for the material spreader. Main roller chain gear 16a is driven by main drive shaft 24a and in turn drives roller drive chains 15b, 15a, 15 on the front side of the apparatus and 15d, 15c, and 15e on the rear side of the apparatus, through drive shafts 24 and small drive gears 16 equipped with slip clutches. Large drive gear 18 is provided for reducing the speed of the power take-off from the tractor. Gear box 51 is provided for causing each of the end elevating augers 13 to turn oppositely with respect to each other so as to cause the material to progress upwardly and rearwardly in both troughs 11. As indicated in FIGS. 3 and 4, roller drive chain 15d is utilized to drive cross auger 43 through oil gear box and worm gear drive assembly 21. Similarly, drive chains 15c and 15e are utilized to drive augers 13. As seen in FIGS. 3 and 5, roller drive chain 15a is utilized to drive rear directing auger 34.

As seen most clearly in FIG. 3, slide clutch 30 for operating the material handler is mounted on main drive shaft 24a, as is clutch 31 for engaging the material spreader 36. Clutch operating lever 28, accessible to the driver of the tractor 50, selectively operates either clutch 30 or 31 through the linkage comprising levers 29 and 33. In the position shown in FIG. 3, clutch 30 is engaged so that the material handling apparatus is in operation. When it is desired to cease feeding material to the spreader, the operator will push clutch operating lever 28 in the direction shown by the arrow, thus disengaging clutch 30 and engaging clutch 31. As explained above, this will cause shaft 24a to drive hydraulic pump 37 so as to selectively actuate pusher plate 41 and auger 40.

As seen in FIGS. 4 and 5, drive shafts 24 are journaled within sealed bearings 45 which in turn are mounted on framing plates 46. As seen in FIG. 4, hydraulic cylinders 25 for raising troughs 11 are mounted on framing members 49 and include hydraulic pipes 47 and supply lines 48. As explained above, however, the manner in which these cylinders are operated is purely conventional and will be readily apparent to those skilled in the art.

In operation, shovels 42 will be placed within the gutters of a barn, for example, and the waste material will then be elevated by augers 13, delivered to cross auger 43, dropped through opening 59 and delivered to rear directing auger 34 from which the material will be fed to spreader 36. When spreader 36 is sufficiently filled, the operator will actuate cylinders 25 through conventional means, raising troughs 11 and augers 13 out of the way and drive the tractor to the area in which it is desired to spread the material. Clutch operating lever 28 will then be pushed forward to engage clutch 31 and provide power from main drive shaft 24a to hydraulic pump 37. As described above, pusher plate 41 and auger 40 may then be actuated in order to uniformly spread the material over the desired area.

Figure 6:
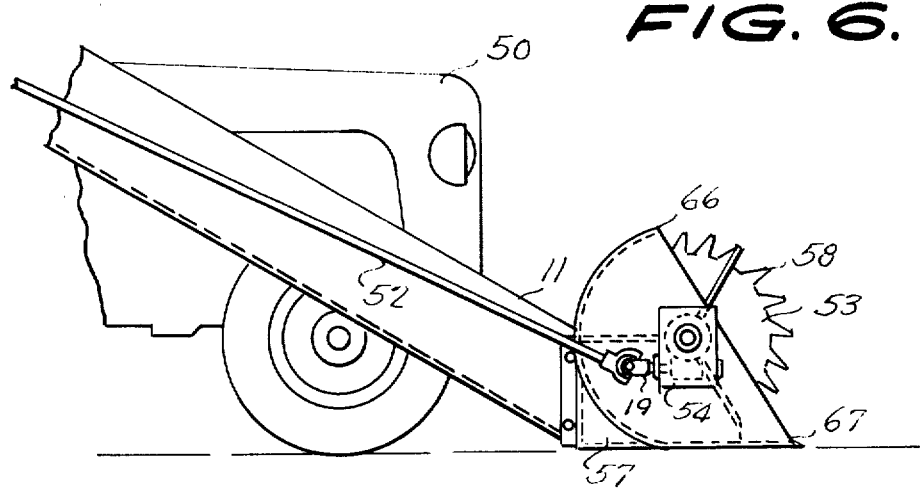
FIG. 6 is a partial front elevational view of a second embodiment of the invention employing a front cross auger.
Figure 7:
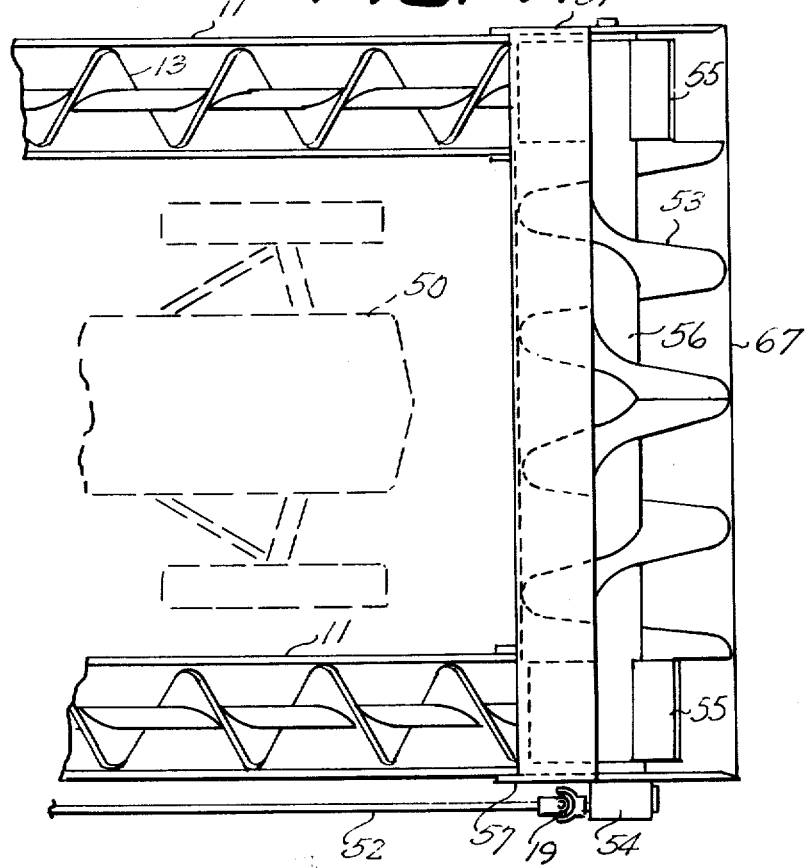
FIG. 7 is a top plan view of the embodiment illustrated in FIG. 6.

When it is desired to operate the apparatus of the present invention in areas other than barn and gutters, as, for example, free stalls, loose housing, or confined feeding yards, the shovels 42 are no longer necessary or practical. Instead, as shown in FIGS. 6 and 7, a front cross auger 53, mounted on shaft 56 and disposed within cowl 66 having front shovel edge 67, is employed. Disposed at each end of mounting shaft 56 are paddles 55 for forcing the material into end elevating auger troughs 11. Auger 53 is so disposed as to force the material from the center to either side and teeth 58 are provided on the outer auger surface to force the material inwardly and grind it up as it passes along the auger. As seen in FIG. 3, shaft 52, which is only utilized in this embodiment of the invention, is driven by worm gear assembly 21 and in turn drives auxiliary worm gear drive 55 in order to actuate auger 54. Framing and mounting members 57 are provided for joining the front cross auger assembly to end elevating auger troughs 11.

The operation of the embodiment of FIGS. 6 and 7 is precisely the same as the described above with respect to the embodiment of FIGS. 1 through 5. The only difference is that rather than working within a confined area such as a barn gutter, the loading operation takes place in a relatively open and unconfined area.

While preferred embodiments of the invention have been described, it will be understood that various modifications may be made therein, which will be readily apparent to those skilled in the art, without departing from the spirit and intent of the invention. Therefore, it is intended that the scope of the invention be defined only by the claims appended hereto.

I claim:

1. A farm waste material handler and spreader, adapted to be driven by the power take-off from a conventional farm tractor or the like, comprising:

a. a pair of spaced rearwardly and upwardly inclined auger conveyors mounted in open troughs;

b. means for feeding said waste material to said inclined conveyors comprising a front cross conveyor disposed between the lower ends of said inclined conveyors;

c. a cross conveyor for bringing together the material from said inclined conveyors;

d. a rear directing conveyor for conveying said material from said cross conveyor rearwardly;

e. a material spreader communicating with said rear directing conveyor for spreading said waste material received from said rear directing conveyor;

f. main drive shaft means driven by said power take-off for powering said conveyors and said material spreader; and g. clutch means mounted on said main drive shaft means for selectively activating said conveyors or said material spreader.

2. The material handler set forth in claim 1, wherein said front cross conveyor comprises an auger means mounted on a shaft for directing said material to said inclined conveyors.

3. The material handler set forth in claim 2, further including paddle means mounted on each end of said shaft for forcing said material into said inclined conveyors.

4. The material handler set forth in claim 3, further including means linked to said main drive shaft for driving said front cross conveyor.

5. The material handler set forth in claim 1, further including hydraulic means powered by said main drive shaft means for actuating said material spreader.

6. The material handler set forth in claim 5, wherein said material spreader comprises selectively actuable auger means for spreading said material and pusher blade means for feeding said material to said auger means.

7. A farm waste material handler and spreader, adapted to be driven by the power take-off from a conventional farm tractor or the like, comprising:

a. a pair of spaced rearwardly and upwardly inclined auger conveyors mounted in open troughs;

b. means for feeding said waste material to said inclined conveyors comprising a pair of open ended shovels having a broad continuous surface and a straight and continuous front edge for scooping said waste material from its place of deposit, one of said shovels being mounted at each lower forward end of said troughs, and extending substantially forward of the front end of said tractor;

c. a cross conveyor for bringing together the material from said inclined conveyors;

d. a rear directing conveyor for conveying said material from said cross conveyor rearwardly;

e. a material spreader communicating with said rear directing conveyor for spreading said waste material received from said rear directing conveyor;

f. main drive shaft means driven by said power take-off for powering said conveyors and said material spreader; and g. clutch means mounted on said main drive shaft means for selectively activating said conveyors or said material spreader.

* * * * *